United States Patent [19]

Bhanot et al.

[11] Patent Number: 4,904,380
[45] Date of Patent: Feb. 27, 1990

[54] PRECOAT FILTER ASSEMBLY

[75] Inventors: Ashok K. Bhanot, Cortland; John D. Miller, Ithaca, both of N.Y.

[73] Assignee: Pall Corporation, Glen Cove, N.Y.

[21] Appl. No.: 148,607

[22] Filed: Jan. 26, 1988

[51] Int. Cl.$^4$ .................. B01D 29/38; B01D 25/10
[52] U.S. Cl. .................. 210/193; 210/323.2; 210/346; 210/418; 210/455; 210/456; 210/487; 210/497.01
[58] Field of Search ............... 210/323.2, 346, 418, 210/420, 435, 455, 456, 484, 485, 486, 487, 497.01, 497.1, 193

[56] References Cited

U.S. PATENT DOCUMENTS

| | | | |
|---|---|---|---|
| 2,383,066 | 8/1945 | McDermott | 183/44 |
| 2,401,222 | 5/1946 | Briggs | 210/62 |
| 2,423,172 | 4/1944 | Booth | 210/144 |
| 2,768,751 | 10/1956 | Booth | 210/169 |
| 2,827,175 | 3/1958 | Cataldo | 210/396 |
| 3,165,472 | 6/1960 | Briggs | 210/457 |
| 3,407,252 | 10/1968 | Pall et al. | 264/131 |
| 3,695,443 | 10/1972 | Schmidt, Jr. | 210/315 |
| 4,033,868 | 7/1977 | Meichsner et al. | 210/38 |
| 4,293,414 | 10/1981 | Gianneli | 210/323.2 |
| 4,419,234 | 12/1983 | Miller et al. | 210/323.2 |
| 4,456,061 | 6/1984 | Swift, Jr. et al. | 210/323.2 |
| 4,517,086 | 5/1985 | Romey et al. | 210/323.2 |
| 4,526,688 | 7/1985 | Schmidt, Jr. et al. | 210/323.2 |
| 4,552,669 | 11/1985 | Sekellick | 210/323.2 |

FOREIGN PATENT DOCUMENTS

| | | |
|---|---|---|
| 0083789 | 7/1983 | European Pat. Off. |
| 501667 | 3/1939 | United Kingdom |
| 581105 | 10/1946 | United Kingdom |
| 614684 | 12/1948 | United Kingdom |
| 0758277 | 10/1956 | United Kingdom |
| 1005987 | 9/1963 | United Kingdom |
| 1003164 | 9/1965 | United Kingdom |
| 1056263 | 1/1967 | United Kingdom |
| 2048099 | 5/1979 | United Kingdom |
| 2192810 | 1/1988 | United Kingdom |

OTHER PUBLICATIONS

Pall Corporation, Scientific & Laboratory Services Dept., SLS Report No. 1868, Nov. 19, 1986.
Pall Corporation, Scientific & Laboratory Services Dept., SLS Report No. 1977, Mar. 23, 1987.

Primary Examiner—Richard V. Fisher
Assistant Examiner—Wanda L. Millard
Attorney, Agent, or Firm—Leydig, Voit & Mayer

[57] ABSTRACT

A precoat filter element for a precoat filter unit comprises a flow distributor and flow straightener. The flow distributor surrounds a filter septum and has openings through which liquid may flow. The proportion between the area of openings and the area of a wall of the flow distributor may vary along the length of the septum to distribute flow over the length of the filter septum in a predetermined manner. A flow straightener is provided at the base of the septum to reduce turbulence during precoat and filtration operations, and to reduce the occurrence of large flocs in precoat slurries during coating operations.

24 Claims, 4 Drawing Sheets

PRECOAT FILTER ASSEMBLY

TECHNICAL FIELD

The present invention relates to precoat-type filter elements. Precoat filter units may be used in the chemical processing industry, the treatment of industrial waste, and the treatment of boiler feedwater in nuclear steam generating systems. In particular, these filters are used where, after treatment, the liquid product must be very high in purity and closely adhere to specified standards of deionization or chemical composition. Precoat-type filters are used, for example, in the condenser stage of nuclear power plants.

BACKGROUND OF THE INVENTION

Precoat filter elements are frequently utilized in the treatment of liquids which contain both suspended particulate and dissolved chemical and ionic contaminants where the treated effluent must be of a very high degree of purity and closely adhere to specified standards of deionization or chemical composition. Such applications of precoated filters are found in the chemical processing industry, the treatment of industrial waste water, and the treatment of boiler feedwater in nuclear steam generating systems. Industrial processes utilizing steam from steam generating systems may produce condensate contaminated by corrosion products, by the inleakage of cooling water, and by various substances used in the process. Contaminants in the condensate or boiler feedwater of a nuclear steam generating system may cause corrosion and scaling of heat transfer equipment in the system, damaging heat exchange surfaces and decreasing their heat transfer efficiency. This, in turn, may result in overheating of tubes, followed by tube failure, further equipment damage, and possibly radioactive pollution of the environment. To prevent corrosion in nuclear steam generating systems, water treatment must include conditioning of the raw water supply, condensate returns from process steam or turbines, and boiler water.

A particular example of water treatment requiring stringent quality control, and in which the use of precoated filters is common, is the condenser stage of nuclear power plants. Two principal types of nuclear power plants are boiling water reactors and pressurized water reactors. Though they use different processes for generating steam to drive turbines in producing electricity and require different water chemistry, both employ similar water purification systems commonly referred to as condensate polishers. In boiling water reactors, should particles pass through the feedwater system and into the reactor, they may cause degradation and become radioactive. Should radioactive particles be created, they pose a costly disposal problem and may well present a threat of exposing personnel to radioactive materials. The presence of particulate contaminants in pressurized water reactors can cause stress cracks in heat exchanger tubes.

A raw water supply may initially contain many different types of dissolved and suspended matter. Most commonly, these materials include silica, iron, copper, calcium, magnesium, and sodium compounds. The metallic constituents generally occur in combination with bicarbonate, carbonate, sulfate, and chloride radicals. Many of these materials are ionic in solution, which may be used to advantage in treating the water to achieve a high degree of purity in the effluent.

As the water may contain a wide variety of harmful contaminants, it is common to use more than one technique in the treatment of the water to remove them. Usually, the water is first filtered to mechanically remove the larger suspended particulate contaminants and then demineralized through an ion exchange. The demineralization process, generally known as condensate polishing, can produce water closely approaching theoretical maximum chemical purity from ionic contaminants. Condensate polishing involves a reversible exchange of ions between the liquid phase and a solid phase which occurs by virtue of the charges carried by the ions. The solid phase typically comprises an ion exchange resin saturated with ionic groups which substitute new ions for ions present in the liquid when the solid is brought in contact with the liquid. In the condensate polishing process, ion exchange may be used to treat the contaminated water in two ways; ionic contaminants in the water may be replaced by relatively harmless products of deionization and, ionic contaminants may be transformed into products which are harmless or less harmful by replacing key ions in their molecular structure with other ions which in turn react with yet other ions present in the liquid to form the relatively harmless products. In the second case, for example, the replacement ions may react with remaining ionic contaminants to form additional water.

In one process for demineralizing boiler feedwater or steam condensate, for example, it is common to provide one tank, containing a resin saturated with hydrogen ions to replace metallic cations in the water, in series with another tank, to replace anions in the water. Each resin continues ionic substitution of contaminants until its deionizing capacity is exhausted. Once exhausted, the resin is either replaced, in the case of cartridge-tubular type condensate polishing systems, or regenerated to restore its ion exchange capacity, in the case of deep bed type demineralizer systems.

In condensate polishing systems used in the condensate stage of a nuclear power plant, for example, it is common to utilize a filter unit with precoat filter elements to simultaneously perform the filtration and demineralization steps of the water conditioning process. A filter element of this type of unit comprises a porous support structure, termed a septum, which is coated with a medium, termed a precoat, which performs both the filtration and ion exchange steps. In condensate polishing systems of the cartridge-tubular type, where the precoat is disposable, when the precoat becomes clogged with particulate contaminants, as evidenced by increase in pressure drop, or its ion exchange capacity is depleted, as evidenced by effluent water chemistry, it is discarded in a backwash operation in which the precoat is stripped off the septum and flushed out of the system. A new resin precoat is then applied to the septum.

Figure 1:
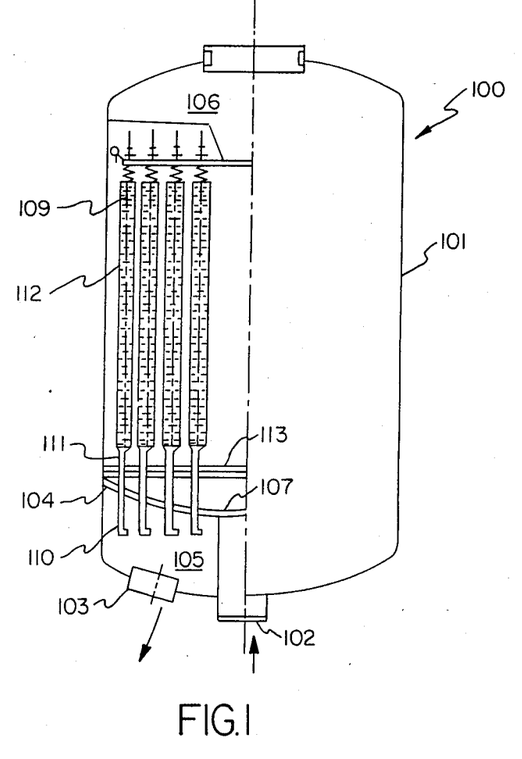
FIG. 1 is a half section schematic view of a precoat filter unit of the prior art.

A typical demineralization filter unit 100 used in such an application is shown schematically in FIG. 1. The filter unit 100 has a housing comprising a pressure vessel 101 which has an inlet 102 and an outlet 103. A tube sheet 104, is secured at its periphery to the inside wall of the vessel 101, and divides the vessel into a lower low pressure chamber, or plenum 105, and an upper high pressure chamber 106. The outlet 103 communicates the plenum 105 with the exterior of the vessel. The upper chamber 106 communicates with the exterior of the vessel via an aperture in the tube sheet 104 and the inlet 102.

Multiple filter elements 109 are located within the upper chamber 106. Each of the filter elements 109 includes a stand-off tube 111 which passes through a hole in the tube sheet. Each filter element 109 is supported by the tube sheet 104 and a seat 110 at the base of its stand-off tube 111. Each hole is circumscribed by a gasket (not shown) to provide a seal between the tube sheet and the stand-off tube. Each filter element 109 comprises a hollow core (not shown) and a porous septum 112 which can support a resin precoat. When the pressure in the upper chamber 106 is greater than that in the plenum 105, the porous septum allows water to flow into the core. The stand-off tube 111, extending vertically downward from the core serves as a discharge passage for filtrate from the element 109 into plenum 105.

The filter unit 100 of FIG. 1 incorporates perforated baffle plates 113, typical of such precoat filter units, in the upper chamber 106 of the pressure vessel 101, above the tube sheet 104 and over the inlet aperture 107. Thus, as water enters the upper chamber 106 through the inlet 102, the flow encounters the baffle plates 113 and flows throughout the upper chamber 106. The baffle plates are intended to reduce turbulence in the lower central portion of the chamber near the inlet, in particular, and throughout the chamber, in general.

Three basic, commonly used precoat filter septa are the yarn wound perforated core, coarse mesh, and porous metal cartridge types. Generally, these septa are of cylindrical configuration, though some may be of other configurations. Yarn wound perforated core septa typically comprise a perforated cylindrical stainless steel hollow core wrapped with string or yarn windings. Polymeric yarns, such as nylon or polypropylene, are commonly used. These yarns typically have a diameter of 1/16 inch and are wrapped around the hollow core to provide a septum depth of approximately ½ inch. Once the contaminated water has flowed through the precoat, it is intended to pass through the microporous openings of the yarn filaments rather than through any spaces between adjacent strands in the yarn winding. Coarse mesh septa include septa made of polypropylene mesh and wire mesh. Porous metal cartridges generally comprise a filtration medium of fine metal particulates sintered or otherwise bonded together. Coarse mesh septa and porous metal cartridges may be wound with yarn.

Precoats for these filters typically comprise a slurry of ion exchange resin particles suspended in a deionized water base. The suspension is formulated with a predetermined ratio of cation and anion particles, depending on the intended application.

The operation of the filter unit 100 of FIG. 1 may be divided into two stages: (1) a precoat stage and (2) a filtration stage. Generally, each filter septum 112 is precoated by introducing a flow of precoat resin slurry through the inlet 102 past the baffle plates 113 and through the filter elements 109 to accumulate a precoat layer on the upstream surface of the septum 112. The resin particle size distribution, flow rate, and proportion of flocculants are optimized to achieve proper precoat. The precoat layer is then compressed on the surface of the septum 112 of each element 109 by continuously circulating deionized water through the coated septum briefly at the process flow rate. A good precoat should exhibit an even thickness along the entire length of each of the septa, experience no erosion of the cake during precoat or treatment cycle, have no radial or axial cracks, and be of uniform thickness on all septa in the filter unit housing.

During the water treatment stage, the contaminated water flows into the vessel 101, through the inlet 102, past the perforated baffle plates 113 and into the upper chamber 106. The water contacts the resin precoat on the surface of each septum 112 and flows radially inward, first through the precoat and then through the septum 112. As the water flows through the resin precoat, the specially formulated ion exchange resin particles remove or transform minerals and other ionic contaminants in the water by the processes described above. The ion exchange precoat also acts as the filtration medium and typically has a finer pore structure than that of the septum 112. Ideally, particulate contaminants are captured in the precoat and prevented from penetrating into the septum 112. The treated filtrate then passes through the septum 112 to the core of the filter element 109, flows through the stand-off tube 111, into the plenum 105, and exits the vessel 101 through the outlet 103.

As the precoat continues to capture particulate contaminants during the demineralizing operation, the pressure differential across the filter unit 100 required to maintain a given flow rate increases until it reaches a level at which the filtration operation becomes too inefficient, and, as ion exchange continues, the ion exchange capacity of the resin is depleted, as evidenced by the change in water effluent chemistry. At that time, the treatment stage is discontinued, and the filter unit 100 is subjected to a backwash operation in which water is flushed through the unit in the reverse direction. The exhausted precoat is stripped off each septum 112 and flushed out of the system by the reverse flow. A new cycle is then begun with a new precoating operation.

Known demineralization precoat filter systems of this type have several defects. Generally, in precoat filter units of the prior art, uniform precoat of the filter septa 112 is not achieved. Despite the baffle plates 113, flow in the bottom of the vessel 101 is generally turbulent. This turbulent flow may result in erosion of the precoat over the lower portion of the septa. At higher flow rates, turbulent flow can be a cause of irregularity of the precoat thickness over the entire length of the element 109. Flocculating agents are generally added to the precoat slurry to promote the build-up of a thick but loosely packed permeable layer of precoat over the septum. In bottom inlet type vessels, a high inflow velocity is used during the precoat stage in an effort to obtain a good precoat layer at the top of the filter septa. Flow velocity decreases from the bottom toward the top of the elements. At the bottom of the elements, where velocity is highest, floc size tends to be very small. Over the mid-section of the element, velocity is lower and floc size is optimal. At the top of the element, flocs are much larger because of low velocity and the large oversize flocs produce a non-uniform precoat.

Many prior art precoat filter units are inefficient because backwash frequency is dictated by occurrence of the maximum allowable pressure differential prior to exhaustion of the precoat. The amount of contaminant which can be held within the precoat while maintaining the high flow rate necessitated by the limited flow area of the cylindrical septa within the differential pressure limitation is relatively small. The resin precoat, though clogged with particles, is not exhausted of its demineralizing properties and the precoated filter is utilized to filter less liquid than it could demineralize. Thus, backwashing frequently is dictated by the pressure differential, useful precoat is wasted, and the amount of radioactive waste which must be disposed of is increased.

DISCLOSURE OF THE INVENTION

The precoat filter element of the present invention provides longer life and greater efficiency than those of the prior art. In the filter element of the present invention, an integral flow straightener is used to reduce turbulence at the bottom of the filer septum. A flow distributor is also used to greatly reduce the component of the liquid flow in the axial direction along the filter element at the surface of the septum and promote a more uniform flow density over the length of the filter element. The flow straightener and flow distributor, which are described in greater detail below, may be used separately but, in the preferred embodiment, they are used in combination.

Where the improved filter element of the present invention is supported by a stand-off tube within a bottom-inlet chamber of a precoat filter unit housing, the flow straightener is disposed around the bottom filter element septum. It is an object of the flow straightener to reduce turbulent flow and thus to reduce or eliminate precoat erosion in both the precoat and treatment stages, to reduce the frequency of backwashing required due to irregularities in the thickness of the precoat and consequent disparity in the exhaustion and plugging of the precoat, and to reduce precoat application time.

The flow straightener further reduces oversized flocs in the resin precoat slurry mitigating non-uniformity of the of the precoat.

In the present invention the flow distributor provides uniform flow along the length of the septum. The flow distributor comprises a wall generally surrounding and coaxial with the filter septum with openings through which liquid can flow to the septum. The proportion of the area of the openings to the area of the cylinder wall varies over the length of the filter element such that liquid flow to the septum is distributed along the septum in a predetermined manner. The controlled flow distribution reduces precoat erosion on the lower portion of the filter element to provide and maintain a uniform precoat along the length of the septum of the filter element during precoat application, and provide for uniform exhaustion of the precoat to extend precoat life.

A filter element for the precoat type filter unit comprises a septum of any convenient cross sectional form surrounding and generally coaxial with a cylindrical support and drainage core. The core has a perforate wall defining a central drainage space. The perforate wall allows filtrate to flow into the drainage space, and to an end of the core.

In accordance with these aspects of the invention, a precoat filter element is disclosed providing improved efficiency and improved filtrate quality.

BRIEF DESCRIPTION OF THE DRAWINGS

FIGS. 3 and 3b are detailed sectional views of two alternative embodiments of the flow straightener of the present invention.

FIG. 4 is a schematic illustration showing a possible distribution of open area over the surface of a flow distributor of the present invention.

BEST MODE FOR CARRYING OUT THE INVENTION

Figure 2:
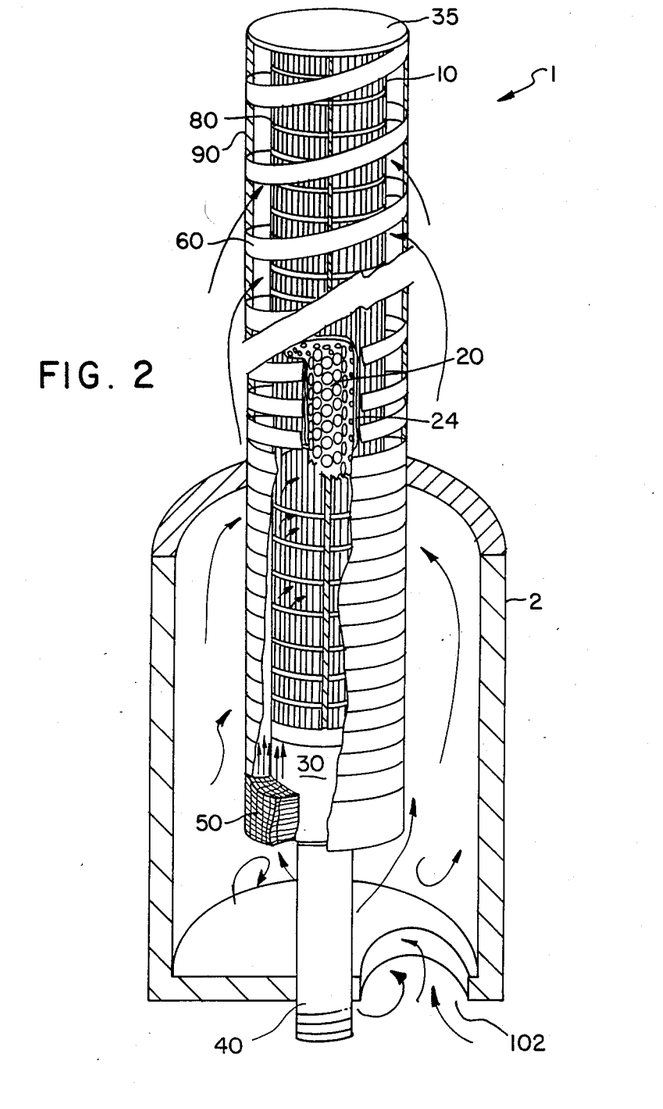
FIG. 2 is a cut-away perspective of a preferred embodiment of the precoat filter element of the present invention.

FIG. 2 shows an exemplary precoat filter element 1 embodying the present invention enclosed within the housing 2 of a single element precoat filter unit. The precoat filter element of the exemplary embodiment generally comprises a septum 10 coaxially mounted on a perforated metal core 20. The core comprises a perforate cylindrical wall 24 defining a drainage space therein. The core 20 is mounted on a base cap 30. A standoff tube 40 extends. from the base cap vertically downward and is in fluid communication with the drainage space. A generally toroidal flow straighten 50 circumfuses the base 30 and stand off tube 40. A flow distributor 60 surrounds the septum 10.

The perforated cylindrical metal core 20 may be made of any suitable material, for example, from stainless steel. The core 20 has two caps, an upper end cap 35 and a base cap 30. The upper end cap 35 is disposed at the upper end of the core and the base cap 30 is disposed at the lower end of the core. The caps are fixedly secured to the cylindrical core wall 24 by welding or any other suitable bonding technique, for example, resin bonding.

In the exemplary preferred embodiment, the septum 10 comprises a longitudinally pleated form, but may be of any convenient form, for example, cylindrical. Circumferential bands 80 may wrap around the pleats 12 at intervals along the vertical length of the septum to support the pleats against bending stresses. These bands may be made of any suitable material, for example, stainless steel. The bands may be attached to the tips 16 by any suitable means, for example, press fitting. Examples of septa materials are wound polymeric yarns, such as nylon or polypropylene, fine mesh porous metal membranes such as Pall Corporation's PMM, sintered woven wire meshes Supramesh, Rigimesh, and fiber metal. PMM, Supramesh, and Rigimesh are registered trademarks of Pall Corporation.

The preferred embodiment of the improved precoat filter element comprises a flow straightener 50 which reduces turbulence of the flow near the inlet 102 to the filter chamber. The flow straightener preserves precoat uniformity, during both inflow of resin slurry over the precoat application cycle, and inflow of contaminated liquid over the filtration and treatment cycle, by preventing erosion of the precoat. The flow straightener also serves to reduce the large flocs in the inflowing resin slurry.

Figures 3A, 3B, 4:
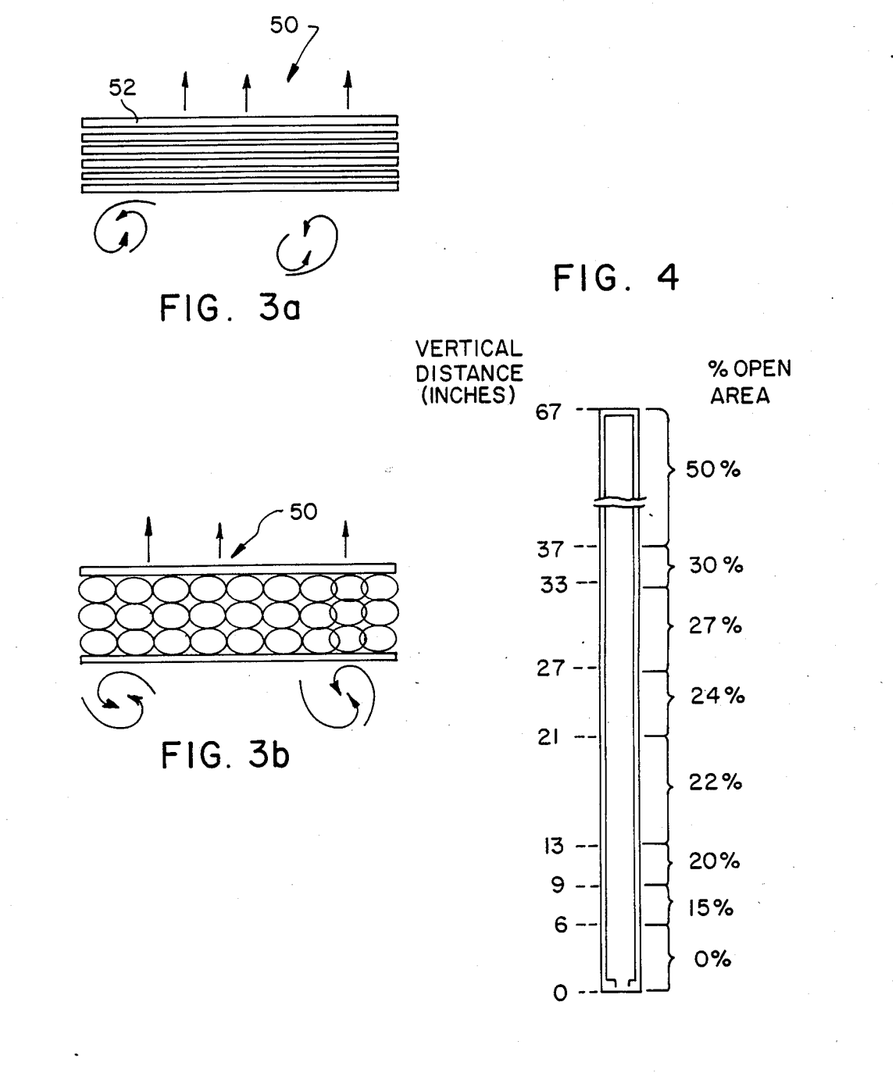

FIG. 3 details two embodiments of the flow straightener 50. As shown in FIGS. 3a and 3b detail, the flow straightener 50 may comprise several randomly stacked layers 52 of woven wire mesh screen. In the preferred embodiment of FIG. 2, the filter element takes a generally annular configuration and, accordingly, these mesh layers are of disc configuration. Because, as discussed above, the annular configuration illustrated need not be a limitation of the present invention, the wire mesh layers may take any configuration suitable to a particular filter unit. In a typical application, for example, the discs may be made of wire of a diameter of 0.032 inch. There may be six layers of vertically stacked layers 50, the stack totaling 0.4 inch in thickness. In the exemplary straightener, the discs shaped layers 52 surround the filter stand-off tube 40 as described and fill the annular space between the stand-off tube 111 and the flow distributor 60. Alternatively, the wire mesh straightener 50 may comprise a bundle of knit mesh screen sandwiched between two layers of woven wire mesh screen such as used in the embodiment described above. Such an embodiment of the straightener 50 is shown in FIG. 3b. In a typical application the knit mesh may be formed having 4 wires to an inch, the wires having a diameter of 0.01 inch.

The wire mesh stack of FIG. 3a is preferably fashioned from wire screen having a high percentage of voids. The irregularity of the stacked wire strands and the irregularity with which the voids occur between the strands in the stack provide convoluted flow paths in the mesh which have a turbulence dampening effect on fluid flowing therethrough. Turbulence of the flow is reduced and is significantly more uniform upon exiting the straightener and is less erosive of the established precoat on the septum 10. During initial coating of the septum with the resin slurry, the straightener 50 also serves to break up larger flocs in the slurry flow, resulting in a more uniform precoat.

Though the septum 10 of the preferred embodiment in FIG. 2 is of pleated configuration, it is readily understood by those skilled in the art that the flow straightener of the present invention may also be used to advantage with septa of other configurations, for example, cylindrical septa. Also, the flow straightener may be fashioned of other materials, for example, it may comprise bundled tubes or a metal plate with drilled or punched out passages.

In the exemplary embodiment shown, the flow straightener wire mesh pack 50 is disposed a predetermined distance below the septum 10 in the path of the turbulent inflow to protect the lowermost portion of the precoat which is most susceptible to erosion by turbulence associated with that inflow. The filter element of the preferred embodiment of the present invention works best if either of the two straightener embodiments described above are positioned, at the base of the flow distributor, 1 to 4 inches below the bottom of the septum. Even if the flow straightener and distributor base are placed just below the septum, the straightener may work satisfactorily at relatively low flow rates. However, as the flow rate increases, erosion of the precoat cake near the bottom of the septum may occur. If the flow straightener is positioned 1 inch below the filter septum, generally no erosion of the precoat is noticed for a majority of flow conditions and precoat compositions. It has been experimentally determined that a 4 inch spacing between the bottom of the septum and the straightener is generally sufficient for all process flow rates and resin compositions. This spacing may be increased to more than 6 inches for increased protection from erosion where the geometry of an existing housing allows, or if a concomitant increase in pressure drop is acceptable for a newly designed housing.

In the exemplary embodiment of FIG. 2 the straightener has a generally annular configuration, and surrounds the filter base 30, extending radially outward to contact the innermost surface of a flow distributor 60. It will be apparent to those familiar to the art that the flow straightener may be utilized in a multiple element filter housing as in FIG. 1, where distributors were not utilized.

A flow distributor 60 surrounds the septum 10 of the preferred embodiment of the precoat filter element in FIG. 2 to distribute inflowing liquid over the length of the septum in a predetermined manner. The flow distributor comprises a wall which generally encloses the septum. The wall has openings which vary in proportionate size over the length of the septum. The wall generally blocks flow from the chamber to the septum while the openings allow liquid to flow to the septum. The local flow distribution over the septum length is determined by the varying local ratio of the open area to the total surface area of the distributor wall along the length of the septum.

As illustrated in FIG. 2 the flow distributor 60 of the preferred embodiment comprises a spiral baffle which may extend substantially the entire length of the septum 10. In the exemplary embodiment, the spiral baffle diffuser 60 comprises, for example, a metal band wound in a spiral configuration and held in position by four spacer rods 90 disposed about the septum 10. Further, the distributor surface may be of other than cylindrical form, of elliptical or octagonal cross-section, for example. The spirally wound band of the exemplary embodiment defines a cylindrical surface surrounding the septum 10, and is wound with varying pitch to provide open area of a varying proportion of the surface area of the cylindrical surface along the length of the element.

As previously described, in the exemplary embodiment of FIG. 2, the cylindrical inner surface of spiral baffle diffuser 60 intimately contacts the outer surface of the flow straightener 50. These surfaces may be bonded by any suitable means, for example, welding. The metal band of the spiral baffle diffuser 60 may be wound with a pitch equal to the band width so that adjacent band windings contact each other over a lower portion of the element, thus providing a closed barrier blocking all radially incoming flow to the septum. For example, in a typical application, the first six inches of the septum 10 may be completely enclosed by the spiral baffle diffuser 60 with no openings. During the precoat process, this would allow only flow entering through the straightener 50 to coat the base of the septum. The portion of the inflow bypassing the straightener 50 would be distributed along the length of the septum 10 beyond this lower segment.

Spiral pitch, as defined by the longitudinal distance from an arbitrary point on a given band winding to the corresponding point on the next winding, will thus vary with the distance along the axis. For an example, a 0.5 inch band might be used and the first six inches completely covered by winding the band with 0.5 inch pitch, the next 30 to 60 inches opened by gradually increasing from a 0.5 inch to 1.5 inch pitch, and the balance of the element wound with a 1.5 inch pitch. The length of the closed area along the lower portion of the septum might range, for example, from approximately 4 inches to 8 inches, and will be a factor in determining the size of the upper openings 64. A practical range for the width of the spiral band might be, for example, between 0.25 inch and 1.0 inch. Further, the lengths over which the spiral pitch changes may be varied. This, however, is not a limitation of the present invention and the band's spiral pitch may vary according to various criteria. For example, the pitch may be made to vary linearly or according to some polynomial, to give an open area which also varies in proportion to the total surface area in a predetermined manner. FIG. 4 shows a schematic representation of an exemplary increase in the amount of open area relative to the total cylindrical surface area along the length of such a spiral band flow distributor.

Experiments have shown that the precoat filter element according to this invention does not significantly increase pressure drop and allows satisfactory cleaning of the element by backwashing. Also experiments have shown that a very uniform resin precoat may be obtained over the entire septum length in the precoat stage, and erosion during the treatment stage may be drastically reduced or eliminated.

Configurations other than the spiral baffle distributor may be similarly utilized. For example, the distributor wall may be defined by rings, coaxial with the septum and core and spaced longitudinally to provide the desired flow area, or comprise a perforate cylinder.

Figure 5:
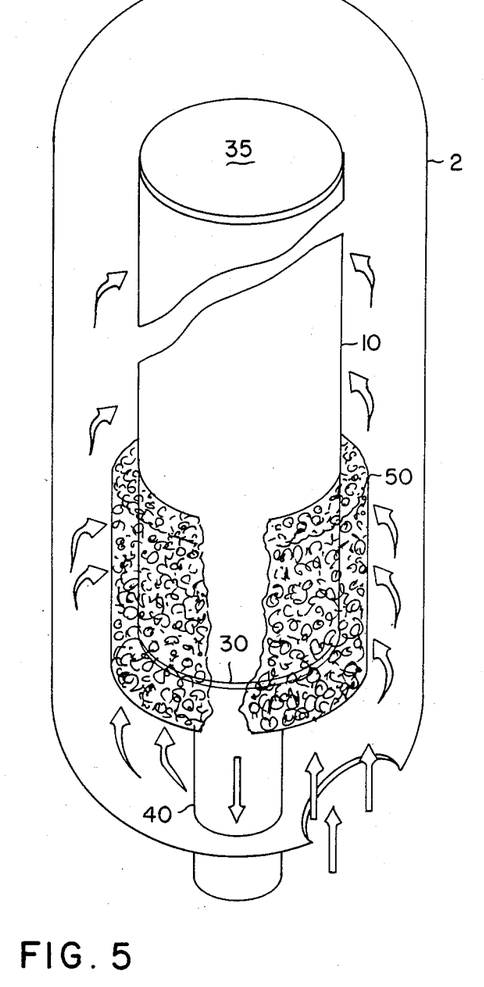
FIG. 5 is a perspective view of an embodiment comprising the flow straightener of the present invention in a single filter element.

FIG. 5 is a perspective view of another exemplary embodiment comprising the flow straightener of the present invention. In this embodiment, a wire knit mesh, similar to that of the embodiment of FIG. 3, is spirally wrapped around the bottom of the filter septum and downward onto the stand-off tube below the septum. In the exemplary embodiment, the thickness to which the wire is wrapped on the stand-off tube is such that it provides the same outside diameter of wrap as on the septum. The thickness of the spiral wrap on he septum may be, for example, 0.25 to 0.3 inch on the septum and might extend 8 inches or more upward along the filter septum and 2 inches or more downward along the stand-off tube. The thickness of the wire mesh wrap may be varied, for example, from 0.25 to 0.3 inch, as dictated by the housing geometry and spacing between septa of the filter elements in a multiple element housing. The knit wire mesh wrap of the flow straightener of this embodiment may be made of any suitable material, for example, metals or polypropylene, nylon, or other polymers. Woven wire, extruded plastic mesh, or perforated metal or plastic with sufficiently high void ratio and sufficiently small pore size might also be used. The wire diameter, number of wires per unit length, and voids percent of the wrap may be varied, in any suitable combination.

The three-dimensional configuration, high voids volume, and surface roughness of the spiral mesh wrap helps provide a thick, uniform resin precoat at the bottom of the filter septum during the precoat cycle, and a generally uniform precoat over the entire length of the septum.

This exemplary embodiment of the flow straightener of the present invention is very cost effective as compared to the combined flow straightener-distributor embodiment of FIG. 2. This spirally wrapped design is preferred where housing geometry or other design constraints do not permit employing flow straighteners of the embodiment of FIG. 3, and economic factors do not permit employing flow straightener-distributor combinations as in FIG. 2. Experiments on Pall PMM 250 septum have shown that, with this exemplary embodiment, when the flow rate is increased to a process condition of about 4 GPM per sq. ft., a partial precoat erosion may take place under the wire mesh but sufficient precoat will remain to prevent the bottom of the septum from being exposed to process contaminants during the filtration-demineralization cycle. If a cellulose fiber overlay is applied on top of the resin precoat, the overlay thickness will be generally uniform over the entire length of the septum, though a partial, insignificant erosion of overlay may take place at process flow rate. Experiments performed on Pall Profile 400 with a spirally wrapped knit mesh produced a good uniform precoat and insignificant erosion over the lower portion of the septum at process flow rate. While satisfactory erosion control can thus be obtained with this embodiment of the flow straightener of the present invention, this spirally wrapped flow straightener does not provide significant deflocculation in resins during the resin precoat cycle as does the straightener embodiment of FIGS. 2 and 3.

While an exemplary precoat filter elements embodying the present invention have been shown, it will be understood that, of course, the invention is not limited to that embodiment. Modification may be made by those skilled in the art, particularly in light of the foregoing teachings. It is, therefore, contemplated by the appended claims to cover any such modification which incorporates the essential features of this invention or encompasses the true spirit and scope of the invention.

I claim:

1. A filter assembly for a precoat type backwashable filter unit with a filter element chamber for holding liquid at high pressure and having an interior wall, an upper end, and a liquid inlet comprising:
    a filter element including
        a central cylindrical support and drainage core with an upper end, a lower end, a central drainage space, and a perforate wall to allow filtrate to flow into the drainage space and thence to an end of the core,
        means for supporting a precoat including a septum surrounding and generally coaxial with said core, and
        a base cap disposed at a lower end of said drainage core below said septum;
    a stand-off tube extending downward from the base cap and passing through the lower end of said chamber to carry filtrate from the central drainage space; and
    a flow straightener for reducing turbulence, the flow straightener traversing a fluid flow path between said septum and said inlet and comprising a wire knit mesh wrapping around said stand-off tube.

2. A filter assembly for a precoat type filter unit with a filter element chamber for holding liquid at high pressure and having an interior wall, an upper end, a lower end, and a liquid inlet comprising:
    a filter element including
        a central cylindrical support and drainage core with an upper end, a lower end, a central drainage space, and a perforate wall to allow filtrate to flow into the drainage space and thence to an end of the core and
        means for supporting a precoat including a septum surrounding and generally coaxial with said core and
    a flow distributor with a wall surrounding and generally coaxial with said core and said septum, said wall having openings defining an open area through which liquid may flow, the local ratio of the open area to the total surface area of the wall varying along the length of the septum.

3. A filter assembly as in claim 2 in which said flow distributor wall is generally cylindrical and comprises a spiral band extending helically in an axial direction along the axis of the element, said spiral band having a pitch varying along the axis of the assembly to define the proportion of open area to the total surface area of the cylindrical wall.

4. A filter assembly as in claim 2 in which said filter element further includes a base cap disposed at a lower end of said drainage core below said septum and in which said filter assembly further comprises a stand-off tube extending downward from the base cap and passing through the lower end of said chamber to carry filtrate from the central drainage space through the wall of the chamber and a flow straightener having a central plane lying perpendicular to the axis of said stand-off tube and intercepting said axis at a point beneath the septum, the distributor extending downward below said septum such that the flow straightener traverses a generally annular space defined between an inner surface of the distributor wall and the stand-off tube.

5. A filter assembly for a precoat type backwashable filter unit with a filter element chamber for holding liquid at high pressure and having an interior wall, an upper end, a lower end, and a liquid inlet comprising:
a filter element including
a central cylindrical support and drainage core with an upper end, a lower end, a central drainage space and a perforate wall to allow filtrate to flow into the drainage space and thence to an end of the core,
means for supporting a precoat including a septum surrounding and generally coaxial with said core, and
a base cap disposed at a lower end of said drainage core below said septum;
a stand-off tube extending downward from the base cap and passing through the lower end of said chamber to carry filtrate from the central drainage space through the chamber wall; and
a flow straightener for reducing turbulence, the flow straightener comprising wire mesh surrounding a portion of said septum adjacent said base cap.

6. A filter assembly as in claim 5 wherein said flow straightener further comprises wire mesh surrounding a portion of said stand-off tube adjacent said base cap.

7. A filter assembly as in claim 6 in which said straightener is cylindrical and has a uniform diameter.

8. A filter assembly as in claim 7 in which said flow straightener extends no less than 8 inches upward from said base cap along said septum and no less than 2 inches downward from said base cap along said stand-off tube.

9. A filter assembly for a precoat-type filter unit having a filter element chamber which holds pressurized liquid and which includes a liquid inlet, the filter assembly comprising:
a filter element including
means for supporting a precoat including a septum which has a drainage space into which filtrate flows and
a base cap disposed at a lower end of said septum;
a stand-off tube coupled to said drainage space of said septum and passing through the chamber to carry filtrate from said septum; and
a flow straightener for reducing turbulence, said flow straightener disposed around said base cap and traversing a fluid flow path between said inlet and said septum.

10. A filter assembly as in claim 9 wherein said flow straightener includes a mesh.

11. A filter assembly as in claim 10 wherein the mesh comprises layers of woven wire mesh screen.

12. A filter assembly in claim 10 wherein the mesh comprises a knit mesh sandwiched between first and second layers of woven wire mesh screen.

13. A filter assembly as in claim 10 wherein the mesh comprises a wrap of wire knit mesh.

14. A filter assembly as in claim 10 wherein the mesh comprises a polymeric material.

15. A filter assembly as in claim 9 wherein said stand-off tube is coupled to said drainage space of said septum through said base cap and wherein said flow straightener extends axially from said base cap along at least a portion of said stand-off tube.

16. A filter assembly as in claim 9 wherein the top of the flow straightener is spaced at least about 1 inch below the bottom of the septum.

17. A filter assembly as in claim 16 wherein the top of the flow straightener is spaced in the range from about 1 to about 4 inches below the bottom of the septum.

18. A filter assembly as in claim 9 wherein said flow straightener extends axially from the base cap along at least a portion of the septum.

19. A filter assembly as in claim 9 wherein said flow straightener is cylindrical and has a uniform diameter.

20. A filter assembly as in claim 9 wherein said filter element further includes a cylindrical core disposed coaxially within said septum and having an upper end, a lower end, and a perforate wall to allow filtrate to flow into the drainage space, wherein said base cap is disposed at the lower end of said core, and wherein said stand-off tube is coupled to said drainage space of said septum through said base cap.

21. A filter assembly for a precoat-type filter unit having a filter element chamber which holds pressurized liquid and which includes a liquid inlet, said filter assembly comprising:
a filter element including means for supporting a precoat, said precoat supporting means including a septum having a drainage space into which filtrate flows and
a flow distributor having a wall surrounding and generally coaxial with said septum, said wall having openings defining on an open area through which liquid may flow and the local ratio of the open area to the total surface area of the wall varying along the length of the septum.

22. A filter assembly as in claim 21 wherein said flow distributor wall is generally cylindrical and comprises a spiral band extending helically in an axially direction along the axis of the element, said spiral band having a pitch varying along the axis of the element to define the proportion of open space area to the total surface area of the cylindrical wall.

23. A filter assembly as in claim 21 wherein the filter element further includes a central core disposed coaxially within the septum and having an upper end, a lower end, and a perforate wall to allow filtrate to flow into the drainage space and thence to an end of the core and a base cap disposed at a lower end of said core below said septum and wherein said filter assembly further comprises a stand-off tube extending downward from the base cap and passing through the lower end of said chamber to carry filtrate from the central drainage space and a flow straightener for reducing turbulence, the flow straightener being disposed around said base cap and traversing a fluid flow path between said inlet and said septum.

24. A filter assembly as in claim 23 wherein said flow straightener traverses a generally annular space defined within an inner surface of the flow distributor wall.

* * * * *

UNITED STATES PATENT AND TRADEMARK OFFICE
CERTIFICATE OF CORRECTION

PATENT NO. : 4,904,380
DATED : February 27, 1990
INVENTOR(S) : Bhanot et al

It is certified that error appears in the above-identified patent and that said Letters Patent is hereby corrected as shown below:

Col. 10, line 28, after "end," insert --a lower end,--.

Col. 12, line 41, delete "on".

Signed and Sealed this

Fifth Day of March, 1991

Attest:

HARRY F. MANBECK, JR.

*Attesting Officer*    *Commissioner of Patents and Trademarks*